March 24, 1959　　P. V. WYSONG, JR., ET AL　　2,878,788
ALTERNATOR VALVE ASSEMBLY FOR REVERSIBLE
FLUID PRESSURE SYSTEMS
Filed Jan. 12, 1956　　　　　　　　　　3 Sheets-Sheet 1
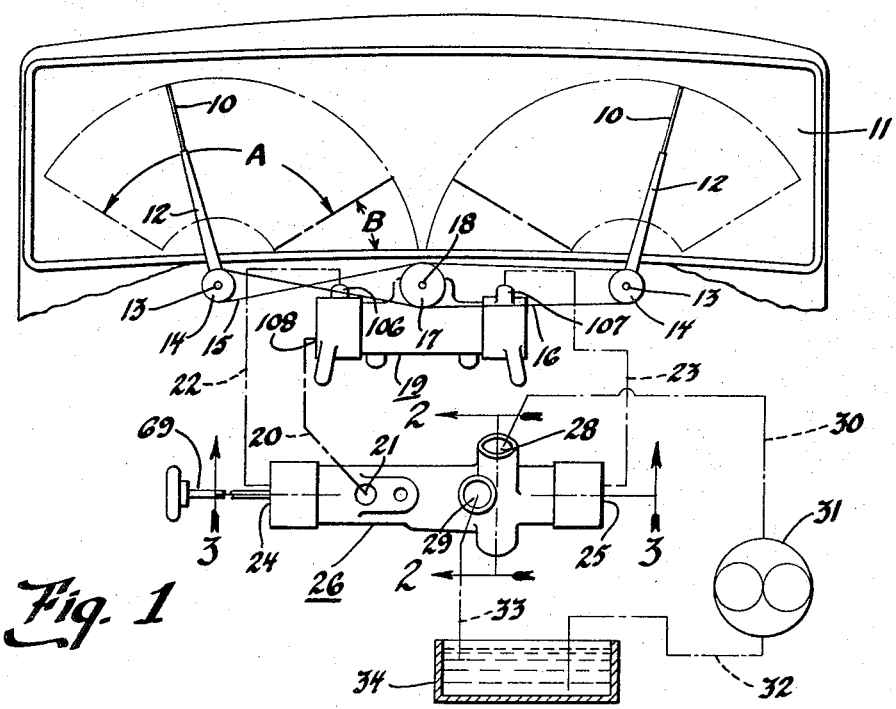
Fig. 1
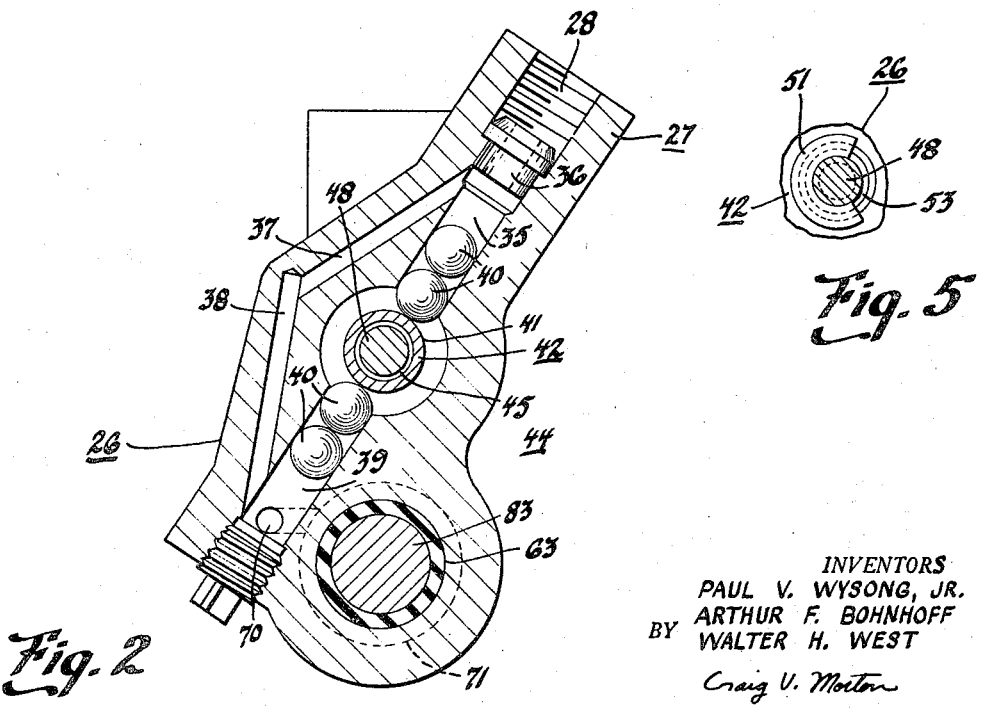
Fig. 2
Fig. 5
INVENTORS
PAUL V. WYSONG, JR.
ARTHUR F. BOHNHOFF
BY WALTER H. WEST
Craig V. Morton
THEIR ATTORNEY

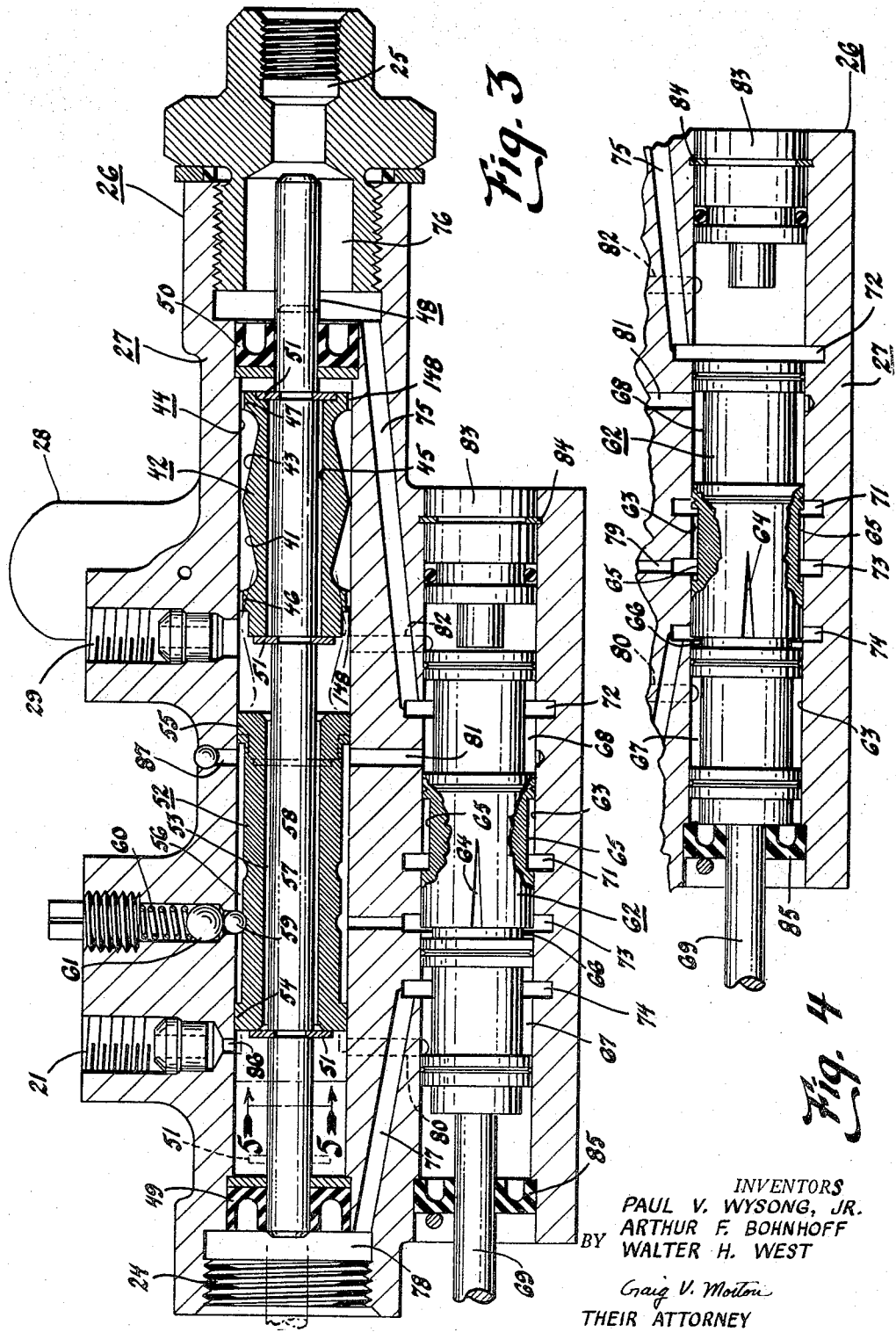

March 24, 1959  P. V. WYSONG, JR., ET AL  2,878,788
ALTERNATOR VALVE ASSEMBLY FOR REVERSIBLE
FLUID PRESSURE SYSTEMS
Filed Jan. 12, 1956  3 Sheets-Sheet 3

INVENTORS
PAUL V. WYSONG, JR.
ARTHUR F. BOHNHOFF
BY WALTER H. WEST

Craig V. Morton
THEIR ATTORNEY

United States Patent Office 2,878,788
Patented Mar. 24, 1959

2,878,788

ALTERNATOR VALVE ASSEMBLY FOR REVERSIBLE FLUID PRESSURE SYSTEMS

Paul V. Wysong, Jr., and Arthur F. Bohnhoff, Saginaw, and Walter H. West, Bay City, Mich., assignors to General Motors Corporation, Detroit, Mich., a corporation of Delaware Application January 12, 1956, Serial No. 558,703

13 Claims. (Cl. 121—150)

This invention pertains to fluid pressure systems, and particularly to an alternator valve assembly for automatically reversing the pressure and drain connections of at least a pair of control ports.

Heretofore, it has been proposed to control a reversible fluid servo-motor by a remotely located reversing, or alternator, valve assembly. One particular application for such a system is a fluid pressure actuated windshield wiper motor for vehicles. However, systems of this character have not been adopted previously because of the complexity of the alternator valve assemblies. The present invention relates to a simplified alternator valve assembly. Accordingly, among our objects are the provision of an alternator valve assembly for automatically reversing the pressure and drain connections of at least a pair of control ports; the further provision of an alternator valve assembly including means for controlling the rate of fluid flow therethrough; the further provision of an alternator valve assembly including means for interrupting the reversal of fluid flow at the control ports when the controlled reversible servo-motor is at a predetermined position; and the still further provision of an alternator valve assembly adapted for controlling hydraulic windshield wiper motor means including means to vary the operating speed thereof and means to park the motor means outside of its normal running stroke.

The aforementioned and other objects are accomplished in the present invention by designing the alternator valve assembly to operate on a pressure build up at the alternator control ports when the servo-motor reaches the ends of its running stroke. Specifically, the alternator control valve assembly is disposed within a valve body, or casing, and includes a metering control valve, a detent spool and a reversing valve spool. The valve casing has an external pressure inlet port, an external drain port and three external control ports when employed for controlling a fluid pressure operated windshield wiper motor having a cylinder with a reciprocable piston therein.

The position of the metering control valve varies the rate of fluid flow from the inlet port to the control ports when it is in the "On" position through metering grooves. When the control valve is in the "Off" position, the rate of flow cannot be varied and when the servo-motor piston reaches the parked position, flow will cease and the system will become static.

The reversing valve spool has a central through-bore, a pair of axially spaced lands which define an annular groove therebetween, and a pair of axially spaced detent grooves adapted to receive a spring-biased detent ball. The valve spool is supported for reciprocable movement in a bore of the casing which communicates with a plurality of internal ports. A reciprocable push rod having piston surfaces at opposite ends is disposed in the valve casing bore, the rod extending through the bore in the valve spool. The valve spool is connected through lost motion means to move in both directions with the rod by abutments thereon.

The detent spool also has a central bore through which the push rod extends, the two spools being mounted for reciprocable movement within the same valve bore. However, the detent spool is connected with the rod for movement in both directions by suitable retaining means. One of the abutments on the push rod constitutes a part of the retaining means for the detent spool and has a lost motion connection with the valve spool, as will be pointed out more particularly hereinafter. The detent spool has a pair of oppositely inclined ramps which are adapted to be alternately engaged by a plurality of fluid pressure biased detent balls. When the servo-motor piston reaches either end of its running stroke, the system, or working pressure will build up to the inlet line pressure and shift the push rod, the detent spool and the reversing valve spool to maintain the motor piston in a state of continuous movement during operation. When the control valve is moved to the "Off" position, fluid under pressure will bypass the reversing spool valve and be applied directly to one side of the motor to extend the wiping stroke and interrupt motor operation.

Further objects and advantages of the present invention will be apparent from the following description, reference being had to the accompanying drawings wherein a preferred embodiment of the present invention is clearly shown.

In the drawings:

Fig. 1 is a schematic view, partly in section and partly in elevation, illustrating a windshield wiper mechanism including the alternator valve assembly of this invention.

Fig. 2 is an enlarged, sectional view taken along line 2—2 of Fig. 1.

Fig. 3 is an enlarged sectional view taken along line 3—3 of Fig. 1 with the control valve in the "On" position.

Fig. 4 is a fragmentary sectional view similar to Fig. 3 with the control valve in the "Off" position.

Fig. 5 is a fragmentary sectional view taken along line 5—5 of Fig. 3.

Figure 7:
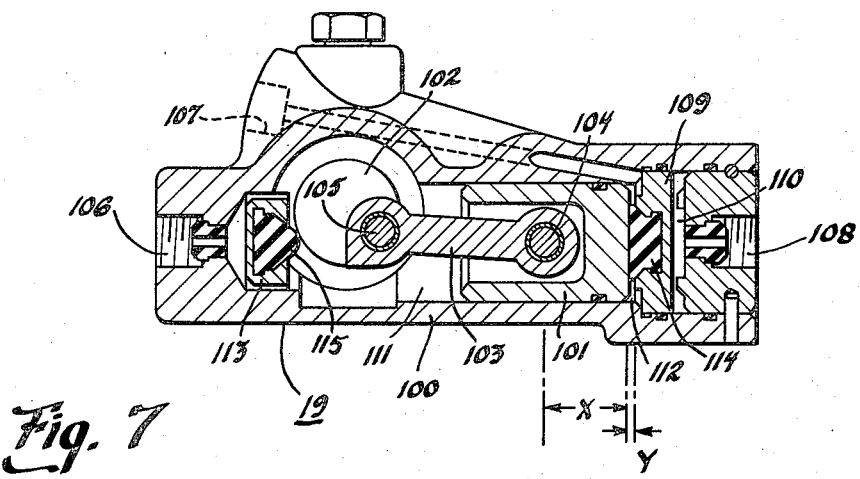
Fig. 7 is a longitudinal sectional view of the wiper motor of Fig. 6.

With particular reference to Fig. 1, a vehicle windshield wiping system is depicted comprising a pair of wiper blades 10, which are arranged for simultaneous asymmetrical movement across the surface of a windshield 11. In a conventional manner, the blades 10 are carried by arms 12 which are drivingly connected to spaced transmission shafts 13. The transmission shafts 13 carry pulley assemblies 14 which are connected by cable drives 15 and 16 to an auxiliary drive pulley 17, which is attached to a wiper motor shaft 18. In accordance with conventional windshield cleaning practice, the blades 10 are arranged for movement throughout a wiping stroke indicated by angle A during operation of the wiper motor 19, and are moved through the angle B to a parked position when operation of the motor 19 is interrupted.

Structually, the wiper motor 19 is of the type depicted in Fig. 7, and, thus, includes a cylinder 100 having a reciprocable piston 101 therein which is operatively connected to a shaft 102 connected to pulley 18 so that piston reciprocation imparts oscillation to the shaft. The operative connection between piston 101 and shaft 102 is constituted by a connecting rod 103, opposite ends of which are pivotally connected to a wrist pin 104 and a crank pin 105. The cylinder 100 has a pair of running ports 106, 107 and a parking port 108. A parking piston 109 is also disposed within the cylinder 100, the right hand surface thereof, as seen in Fig. 7, being exposed to a parking chamber 110 connected to parking port 108. The piston 101 divides the cylinder into running chambers 111 and 112 connected to ports 106 and 107, respectively. The piston is shown at one end of its running stroke in Fig. 7. The running stroke being indicated by X and the parking stroke by Y. Both the parking piston 109 and retainer 113 carry resilient abutments 114 and 115 for decelerating the piston 101 at the running stroke ends.

The wiper motor 19 and inlet ports 106 and 107 are connected by control lines 22 and 23, respectively, to control ports 24 and 25, respectively, of an alternator valve assembly, generally depicted by the numeral 26. The parking port 108 is connected by line 20 to port 21 of the valve assembly. The alternator valve assembly 26 includes a valve casing, or body 27, having an external pressure inlet port 28 and an external drain port 29. The inlet port 28 is connected by a pressure inlet line 30 to the outlet side of an hydraulic pump 31. The inlet side of the hydraulic pump 31 is connected by a line 32 to a sump, or reservoir, 34. The drain port 29 is connected by a drain line 33 to the sump 34.

With particular reference to Fig. 2, the inlet port 28 of the valve body 27 communicates with an internal passage 35 through an annular sealing member 36, and the passage 35 is connected by bores 37 and 38 to a diametrically opposed passage 39. A pair of detent balls 40 are disposed in each of the passages 35 and 39, and since the passages 35 and 39 are connected to the pressure inlet 38, the balls 40 which have a close fit with the passages 35 and 39 are urged inwardly, as viewed in Fig. 2, by the inlet pressure. The detent balls 40 engage diametrically opposed surfaces of a ramp 41 formed on a detent spool 42 disposed within a valve body bore 44.

With reference to Figs. 2 and 3, it may be seen that the detent spool 42 is formed with a pair of opposed ramp surfaces 41 and 43 and also has a bore 45 therethrough. In addition, the detent spool 42 is formed with a pair of axially spaced guide lands 46 and 47 having passages 148 therethrough, the purpose of which will be described hereinafter. A reciprocable push rod 48 is coaxially disposed within the valve bore 44, opposite ends of the push rod 48 being supported by seal assemblies 49 and 50, through which the ends of the push rod 48 extend. The detent spool 42 is connected for movement in both directions with the push rod 48 by a pair of C-shaped snap rings 51, the elevation of which may be seen in Fig. 5.

The alternator valve assembly 26 also includes a reversing spool valve 52 which is connected through lost motion means for movement with the push rod 48 to the right by a third C-shaped snap ring 51. The spool valve 52 is also connected through lost motion means for movement to the left with the push rod 48 by the left hand snap ring 51 associated with the detent spool. The spool valve 52, likewise, includes a central bore 53 through which the push rod 48 extends. In addition, the spool valve 52 is formed with a pair of axially spaced sealing lands 54 and 55, which define therebetween an annular groove 56. The body of the spool valve 52 also is formed with a pair of axially spaced detent grooves 57 and 58, which are adapted to receive a detent ball 59, which is biased into engagement therewith by a spring 60 through a ball 61. The alternator valve assembly 26 also includes a metering control valve 62, which is disposed for manual reciprocable movement within a valve body bore 63. The control valve 62 is formed with a pair of diametrically opposed metering grooves 64, a pair of diametrically opposed axial grooves 65 spaced circumferentially 90° from the metering grooves 64, as well as annular grooves 66, 67 and 68. The control valve 62 is connected to an axially extending rod 69, which extends without the valve casing 27 for manual operation between the positions depicted in Figs. 3 and 4.

The valve casing bore 63 is connected with the pressure inlet port 28 through bores 37, 38, passage 39 and bore 70 to annulus 71 in the bore 63. In addition to the annulus 71, the bore 63 is circumscribed by annuli 72, 73 and 74. Annulus 72 connects with a passage 75, which communicates with valve body servo chamber 76 and the control port 25. Annulus 74 communicates with passage 77, servo chamber 78 and control port 24. Annulus 73 communicates with a port 79 of the bore 44. In addition to port 79, valve bore 44 includes ports 80, 81 and 82. Port 80 communicates at all times with annular groove 67 of the control valve. Similarly, port 81 communicates at all times with annular groove 68 of the control valve. Port 82 communicates at all times with the bore 63 on the right-hand side of the control valve 62.

Movement of the control valve 62 to the right, as viewed in Fig. 3 is limited by a plug 83 which closes one end of the bore 63 and is retained in position by a snap ring 84. Movement of the control valve 62 to the left is limited by engagement with a seal assembly 85.

In addition to control ports 24 and 25, the alternator valve assembly may also reverse the pressure and drain connections of passage 86, which is connected to port 21, and passage 87, which is closed when the valve assembly is used to control a windshield wiper motor. The port 21 will have its pressure and drain connections reversed by the spool valve 52 in phase with port 24 in the "On" position of the control valve 62 whereas the passage 81 will have its pressure and drain connections reversed in phase with port 25. However, with the control valve 62 in the "Off" position, the port 21 will be connected to drain whereas the passage 81 will be connected to pressure, while port 24 is connected to pressure and port 25 is connected to drain.

The balls 40 and the passages 35 and 39 act as pistons since the passages 35 and 39 are honed. A pressure drop is taken across each ball 40 and any fluid which seeps past the balls flows to drain through valve body bore 44, groove 43 and the port 29. The balls 40 react as though they are held in place by constant load springs, since they are always under inlet line pressure. Moreover, the pressure of fluid at control ports 24 and 25 is always less than the line pressure in line 30 during operation of the servomotor 19, this effect being realized since metering grooves 64 always throttle fluid flow.

*Operation*

The alternator valve assembly functions in the following manner to automatically reverse the pressure and drain connections of control ports 24 and 25. With the control valve 62 in the "On" position, as depicted in Fig. 3, inlet oil from port 28 flows through passages 37, 38, 39 and 70 to annular groove 71. From groove 71, the flow of fluid is metered by the grooves 64 and flows into annular groove 73 and port 79 to the annular groove 56 of the reversing spool valve 62. From the annular groove 56, fluid flows through port 81 to annular grooves 68 and 72, and thence, through passage 75 and servo chamber 76 to the control port 25. At this time, control port 24 is connected to drain through servo chamber 78, passage 77, annular grooves 74 and 67, port 80, reversing valve bore 53, bore 44 and port 29. As the piston within the servomotor 19 reaches the end of its running stroke, the system will become static and the pressure at port 25 will increase to line pressure 30. The increase in pressure in servo chamber 76 reacts on the right-hand end of the push rod 48, thereby moving the push rod 48 and the detent spool 42 to the left. As soon as the detent spool 42 and the push rod 48 move far enough to the left for the detent balls 40 to pass over the top of the ramps 41 and 43, the lost motion between the detent spool 42 and the reversing valve spool 52 is taken up and the snap ring 51 on the left-hand end of the detent spool moves the valve spool 52 to the left with a snap action so that detent ball 59 is unseated from groove 57 and seated in groove 58. These positions of the push rod 48, the detent spool 42 and the reversing valve spool 52 are depicted by dotted lines in Fig. 3.

With these parts in the shifted position, port 25 is connected to drain through servo chamber 76, passage 75, annular grooves 72 and 68, port 81, bore 44 and port 29. Likewise, port 24 is connected to pressure through servo chamber 78, passage 77, annular grooves 74 and 67, port 80, annular groove 56, and port 79. Accordingly, movement of the servo-motor piston will be reversed and will continue until the opposite ends of its running stroke is reached at which time the pressure in servo chamber 78 will build up to the line pressure and move the rod 48 from the dotted line position to the full line position, thereby reversing the positions of the spool valve 52 and the detent spool 42. During this time the extreme left hand snap ring 51 on the push rod 48 moves the spool 42. As soon as the lost motion between the snap ring 51 on the push rod and the spool valve 52 is taken up, the spool valve 52 is moved to the right with a snap action unseating detent ball 59 out of groove 58 and reseating same in groove 57.

During running operation of the alternator control valve assembly 26, the rate of fluid flow from the pressure inlet 28 to the outlet control ports 24 and 25 can be varied by the position of the control valve 62. When the control valve 62 engages the plug 83, the rate of fluid flow is increased to a maximum. As the valve 62 is moved to the left, as viewed in Fig. 3, the rate of fluid flow is reduced. When the control valve 62 is moved from the position of Fig. 3 to the position of Fig. 4, movement of the servo-motor piston will automatically be interrupted in the parked position as follows. Fluid under pressure entering port 28 again flows through passages 37, 38, 39 and 70 to annular groove 71. However, at this time, the annular groove 71 is connected by passages 65 to the annular groove 73. Moreover, at this time, the metering grooves 64 are aligned with annular groove 73 so that inlet fluid pressure, as throttled by the metering grooves, flows through annular groove 74 through annular groove 66. Since annular groove 74 is connected by passage 77 to servo chamber 78 and port 24, line 22 will be connected to pressure bypassing the reversing valve spool 52. Parking port 21 is connected to drain port 29 through the hollow spool valve 52. At this time, port 25 will be connected to drain through servo chamber 76, passage 75, annular groove 72, passage 82, bore 44, and port 29. Accordingly, all movement of the servo-motor piston will stop at the parked position since motor port 106 is pressurized and motor ports 107 and 108 are connected to drain, and the system will become static.

Figure 6:
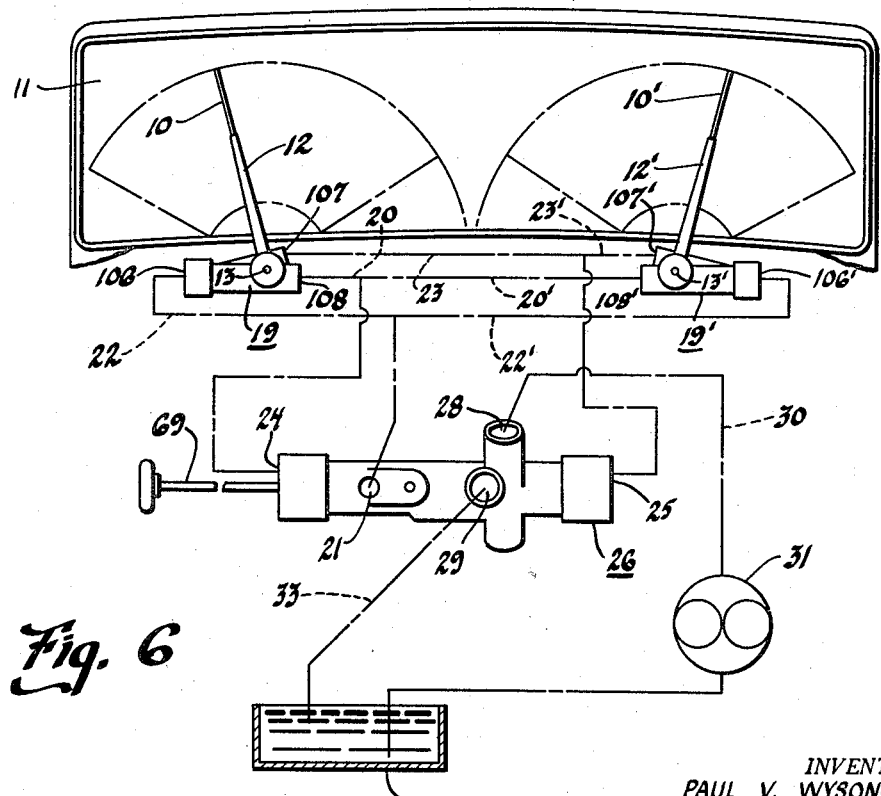
Fig. 6 is a schematic view of a windshield wiper installation wherein each wiper is actuated by an independent motor.

With particular reference to Fig. 6, a dual wiper motor installation is shown, similar numerals depicting similar parts throughout the several views. Thus, wiper blades 10, 10' are connected by arms 12, 12' to shafts 13, 13'. In this instance, the cable drive is eliminated, and the shafts 13, 13' are driven by hydraulically synchronized motors 19, 19' of the type described hereinbefore. The motors 19, 19' are connected by control lines 20, 22 and 23, 20', 22' and 23' to the valve assembly 26, and operation of the installation is identical to that described hereinbefore.

From the foregoing, it is readily apparent that the present invention provides a greatly simplified alternator valve assembly for a reversible fluid pressure system. The valve assembly is unique in that the pressure and drain connections to more than a pair of control ports can be automatically reversed during running operation, and the pressure and drain connections of same control ports can be reversed when the alternator valve assembly is moved to the "Off" position.

While the embodiment of the present invention as herein disclosed, constitutes a preferred form, it is to be understood that other forms might be adopted.

What is claimed is as follows:

1. An alternator valve assembly for automatically reversing the pressure and drain connections of a pair of control ports including, a valve body having a pressure inlet port, a drain port and a pair of control ports, reversing valve means disposed in said body, said reversing valve means having two limit positions wherein the pressure and drain connections of said control ports are reversed, a servo actuated push rod, and abutment means connected with said push rod having lost motion mechanical connections with said reversing valve means for moving said reversing valve means between its limit positions.

2. An alternator valve assembly for automatically reversing the pressure and drain connections of a pair of control ports including, a valve body having a pressure inlet port, a drain port and a pair of control ports, reversing valve means disposed in said body, said reversing valve means having two limit positions wherein the pressure and drain connections of said control ports are reversed, a fluid pressure operated push rod, a spool attached to said rod having a pair of opposed ramps, said push rod having lost motion mechanical connections with said reversing valve means, and a plurality of fluid pressure biased detent balls engageable with the ramps of said spool for effecting snap action movement of said reversing valve means between its limit positions after the lost motion between said push rod and said reversing valve means has been taken up.

3. An alternator valve assembly for automatically reversing the pressure and drain connections of a pair of control ports including, a valve body having a pressure inlet port, a drain port and a pair of control ports, reversing valve means disposed in said body for reciprocable movement, said reversing valve means having two limit positions determined by detent means wherein the pressure and drain connections of said control ports are reversed, a fluid pressure operated push rod, a spool attached to said rod having a pair of opposed ramps, said push rod having lost motion mechanical connections with said reversing valve means, and a plurality of fluid pressure biased detent balls engageable with the ramps of said spool for effecting snap action movement of said reversing valve means between its limit positions after the lost motion between said push rod and said reversing valve means has been taken up.

4. An alternator valve assembly for automatically reversing the pressure and drain connections of a pair of control ports including, a valve body having a pressure inlet port, a drain port and a pair of control ports, reversing valve means disposed in said body, said reversing valve means having two limit positions wherein the pressure and drain connections of said control ports are reversed, means for actuating said reversing valve means, a manually operable control valve, and internal passages in said valve body connecting said control valve with said control ports, said pressure port and said drain port, said manually operable control valve being movable to an "Off" position for bypassing said reversing valve means and connecting one of said control port passages to the pressure port passage to connect one of said control ports to pressure and connecting the other control port passage to the drain port passage to connect the other of said control ports to drain.

5. An alternator valve assembly for automatically reversing the pressure and drain connections of a pair of control ports including, a valve body having a pressure inlet port, a drain port and a pair of control ports, a reversing valve spool disposed in said body for reciprocable movement, internal ports and passages in said valve connectable with said pressure inlet port, said drain port and said control ports, said internal ports and passages communicating with said reversing valve spool, said reversing valve spool having two limit positions wherein the pressure and drain connections of said control ports are reversed through said internal ports and passages, said reversing valve spool having a bore therethrough, and means for effecting snap action movement of said reversing valve spool between its limit positions including a servo actuated push rod disposed for reciprocable movement within said body, said push rod extending through the bore in said reversing spool valve and having lost motion mechanical connections with said reversing valve spool.

6. An alternator valve assembly for automatically reversing the pressure and drain connections of a pair of control ports including, a valve body having a pressure inlet port, a drain port and a pair of control ports, a reversing valve spool disposed in said body for reciprocable movement, internal ports and passages in said valve body connectable with said pressure inlet port, said drain port and said control ports, said internal ports and passages communicating with said reversing valve spool, said reversing valve spool having two limit positions wherein the pressure and drain connections of said control ports are reversed through said internal ports and passages, said reversing valve spool having a bore therethrough, a reciprocable push rod disposed in said body and extending through the bore in said reversing spool valve, said push rod having lost motion mechanical connections with said spool valve to effect movement thereof in both directions, an element connected to move with said push rod for effecting snap action movement of said valve spool between its limit positions, and means for effecting reciprocable movement of said push rod to actuate said reversing valve spool.

7. The valve assembly set forth in claim 6 wherein the limit positions of said reversing valve spool are defined by detent means.

8. The valve assembly set forth in claim 6 wherein said element connected to said push rod comprises a fluid pressure-biased detent spool.

9. The valve assembly set forth in claim 8 wherein said fluid pressure biased detent spool has a pair of opposed ramp surfaces which are engaged by a plurality of balls subject to the pressure at said inlet port.

10. The valve assembly set forth in claim 6 wherein said body includes a manually operable control valve and passages connecting said control valve with said control ports, said pressure port and said drain port, said manually operable control valve being movable to a position wherein said reversing valve spool is bypassed and one of said control port passages is connected to said pressure port passage and the other of said control port passages is connected to said drain port passage so that fluid under pressure is applied to one of said control ports and the other of said control ports is connected to drain.

11. An alternator valve assembly including, a valve body having a pressure inlet port, a drain port, and a pair of control ports, reversing valve means disposed in said body, said reversing valve means having two limit positions wherein the pressure and drain connections of said control ports are reversed, means for actuating said reversing valve means including a servo actuated push rod and abutment means connected with the push rod having lost motion mechanical connections with said reversing valve means for moving said reversing valve means between its limit positions, and manually controlled passage means for bypassing said reversing valve means, applying pressure fluid to one of said control ports and connecting the other control port to drain.

12. An alternator valve assembly including, a valve body having a pressure inlet port, a drain port and a pair of control ports, reversing valve means disposed in said body for reciprocable movement, said reversing valve means having two limit positions wherein the pressure and drain connections of said control ports are reversed, a fluid pressure operated push rod, a spool attached to said rod having a pair of opposed ramps, said push rod having lost motion mechanical connections with said reversing valve means, a plurality of fluid pressure biased balls engageable with the ramps of said spool for effecting snap action movement of said reversing valve means between its limit positions when the lost motion between the push rod and the reversing valve means has been taken up, and manually controlled passage means for bypassing said reversing valve means, applying pressure fluid to one of said control ports and connecting said other control port to drain.

13. An alternator valve assembly for automatically reversing the pressure and drain connections of a pair of control ports including, a valve body having a pressure inlet port, a drain port and a pair of control ports, a pair of bores in said valve body, a reversing valve spool disposed for movement in one of said bores, a manual control valve disposed for movement in the other of said bores, a pair of passages connecting the reversing valve bore and the manual control valve bore, a pair of passages connecting said manual control valve bore and said control ports, a passage connecting said pressure port and said manual control valve bore, a passage connecting said drain port and said manual control valve bore, said reversing valve spool having two limit positions wherein the pressure and drain connections of said control ports are reversed when said manual control valve is in a first position, and means for actuating said reversing valve spool, said manual control valve having a second position wherein one of said control ports is connected to the pressure port and the other control port is connected to the drain port through the passages connecting said ports with said manual control valve bore irrespective of the position of the reversing valve spool.

References Cited in the file of this patent

UNITED STATES PATENTS

| Number | Name | Date |
| --- | --- | --- |
| 313,684 | Phelps | Mar. 10, 1885 |
| 785,172 | Kasai | Mar. 21, 1905 |
| 2,202,023 | Parker | May 28, 1940 |
| 2,302,232 | MacNeil | Nov. 17, 1942 |
| 2,378,320 | O'Shei | June 12, 1945 |
| 2,511,834 | Burns | June 20, 1950 |
| 2,674,233 | Sprague et al. | Apr. 6, 1954 |
| 2,722,200 | Horton et al. | Nov. 1, 1955 |

FOREIGN PATENTS

| Number | Country | Date |
| --- | --- | --- |
| 473,296 | Great Britain | Oct. 11, 1937 |
| 511,312 | Canada | Mar. 22, 1955 |